(12) United States Patent
Hollimon et al.

(10) Patent No.: US 8,998,125 B2
(45) Date of Patent: Apr. 7, 2015

(54) METHOD AND APPARATUS FOR IN-FLIGHT BLADE FOLDING

(75) Inventors: Charles Hollimon, Fort Worth, TX (US); Dudley E. Smith, Arlington, TX (US); David Ludolph, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 178 days.

(21) Appl. No.: 13/576,612

(22) PCT Filed: Jun. 15, 2010

(86) PCT No.: PCT/US2010/038636
§ 371 (c)(1),
(2), (4) Date: Aug. 1, 2012

(87) PCT Pub. No.: WO2011/159281
PCT Pub. Date: Dec. 22, 2011

(65) Prior Publication Data
US 2012/0292456 A1    Nov. 22, 2012

(51) Int. Cl.
*B64C 27/28* (2006.01)
*B64C 29/00* (2006.01)
*B64C 27/30* (2006.01)

(52) U.S. Cl.
CPC ............. *B64C 29/0033* (2013.01); *B64C 27/28* (2013.01); *B64C 27/30* (2013.01)

(58) Field of Classification Search
USPC ................ 244/6, 7 R, 7 A, 17.25, 49, 56, 66; 416/142
See application file for complete search history.

(56) References Cited

U.S. PATENT DOCUMENTS 3,404,852 A * 10/1968 Sambell et al. ............... 244/7 A
(Continued)

FOREIGN PATENT DOCUMENTS

| GB | 1003940 A | 9/1965 |
| GB | 1242337 A | 8/1971 |
| WO | 2006022654 A1 | 2/2006 |

OTHER PUBLICATIONS

International Search Report and the Written Opinion of the International Searching Authority mailed by ISA/USA, U.S. Patent and Trademark Office on Aug. 10, 2010 for International Patent Application No. PCT/US10/038636, 8 pages.
(Continued)

*Primary Examiner* — Timothy D Collins
*Assistant Examiner* — Jamie S Stehle
(74) *Attorney, Agent, or Firm* — James E. Walton; Damon R. Hickman

(57) ABSTRACT

A foldable rotor system for a rotorcraft, the foldable rotor system comprising a rotor assembly operably associated with a driveshaft, the driveshaft being operable associated with an engine, the rotor assembly comprising a rotor blade connected to a grip pin. A swashplate is operable associated with the grip pin in order selectively change a pitch of the rotor blade. A blade fold actuator is operably associated with the grip pin such that the blade fold actuator is configured to fold and unfold the rotor blade about a blade fold axis. During an airplane mode, the rotorcraft can stop and fold the rotor blades so that the rotorcraft relies upon thrust from the engine for propulsion. The rotor blades are folded in a spiral fold path so that the rotor blades remain substantially edgewise, or feathered, during the folding process. The spiral fold path minimizes the aerodynamic drag experienced by the rotor blades while being folded during flight of the rotorcraft.

16 Claims, 12 Drawing Sheets

(56) References Cited

U.S. PATENT DOCUMENTS

| | | | |
|---|---|---|---|
| 3,528,630 A * | 9/1970 | Ferris et al. | 244/12.3 |
| 3,592,412 A | 7/1971 | Glatfelter | |
| 3,693,910 A | 9/1972 | Aldi | |
| 5,031,858 A | 7/1991 | Schellhase et al. | |
| 5,085,315 A | 2/1992 | Sambell | |
| 2006/0067822 A1 | 3/2006 | D'Anna | |
| 2010/0072325 A1 | 3/2010 | Sambell | |

OTHER PUBLICATIONS

Extended European Search Report issued from the European Patent Office from corresponding application No. 10853344.0-1754 dated Jan. 23, 2014 6 pages.

Office Action dated Jul. 17, 2014 from counterpart CA App. No. 2,802,389.

First Chinese Office Action from the corresponding application 201080066903X issued from the Chinese Patent Office dated Jun. 5, 2014.

* cited by examiner

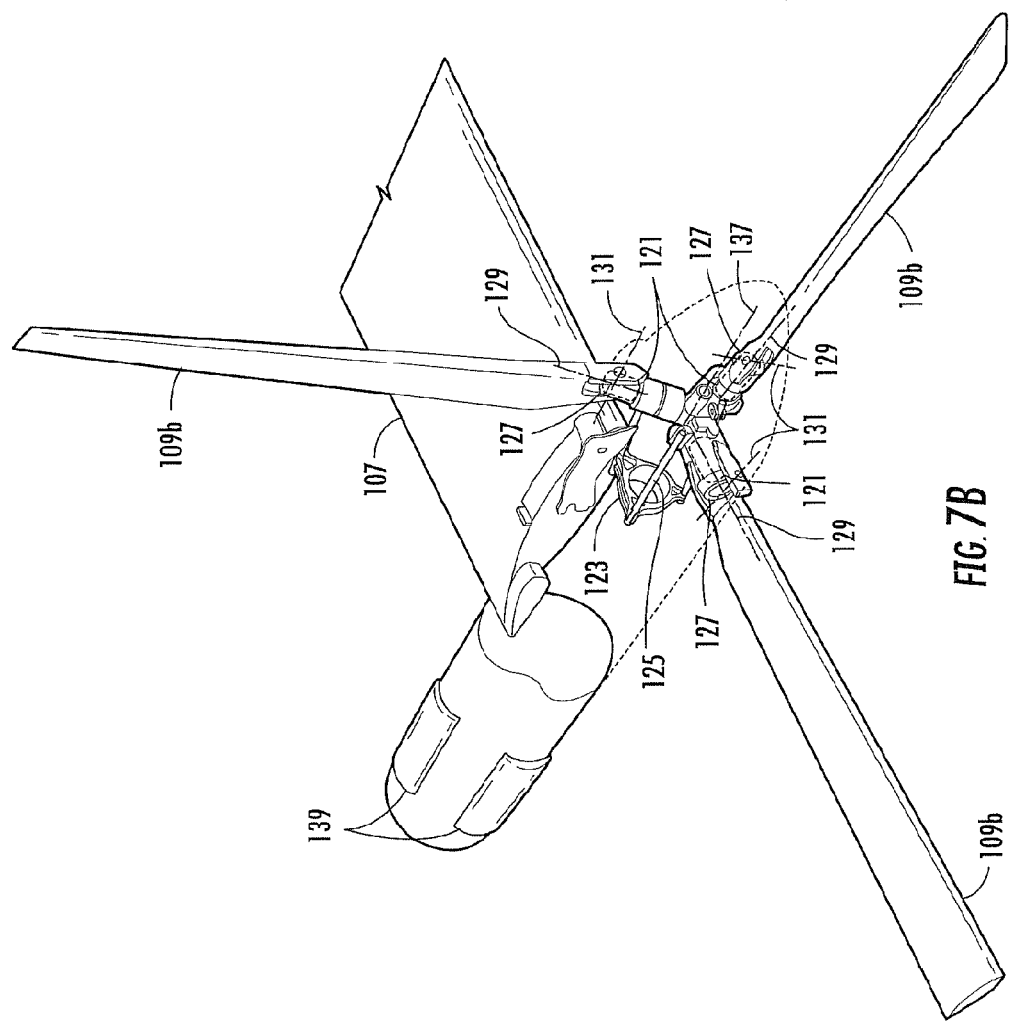

US 8,998,125 B2

METHOD AND APPARATUS FOR IN-FLIGHT BLADE FOLDING

TECHNICAL FIELD

The present application relates in general to the field of rotor blades for rotorcraft; but more particularly, a method and apparatus for the folding of rotor blades during flight.

DESCRIPTION OF THE PRIOR ART

Tiltrotor aircraft are hybrids between traditional helicopters and traditional propeller driven aircraft. Typical tiltrotor aircraft have nacelles with rotor systems that are capable of rotating relative to the aircraft fuselage. Tiltrotor aircraft are capable of converting from a helicopter mode, in which the aircraft can take-off, hover, and land like a helicopter; to an airplane mode, in which the aircraft can fly forward like a fixed-wing airplane. During airplane mode of the tiltrotor, forward speed and range is limited by certain fundamental limitations of the rotor systems.

BRIEF DESCRIPTION OF THE DRAWINGS

The novel features believed characteristic of the method and apparatus of the present application are set forth in the appended claims. However, the method and apparatus itself, as well as, a preferred mode of use, and further objectives and advantages thereof, will best be understood by reference to the following detailed description when read in conjunction with the accompanying drawings, wherein:

FIGS. 7A-7H are perspective views progressively detailing the spiral fold path according to the preferred embodiment of the present application.

Figure 1:
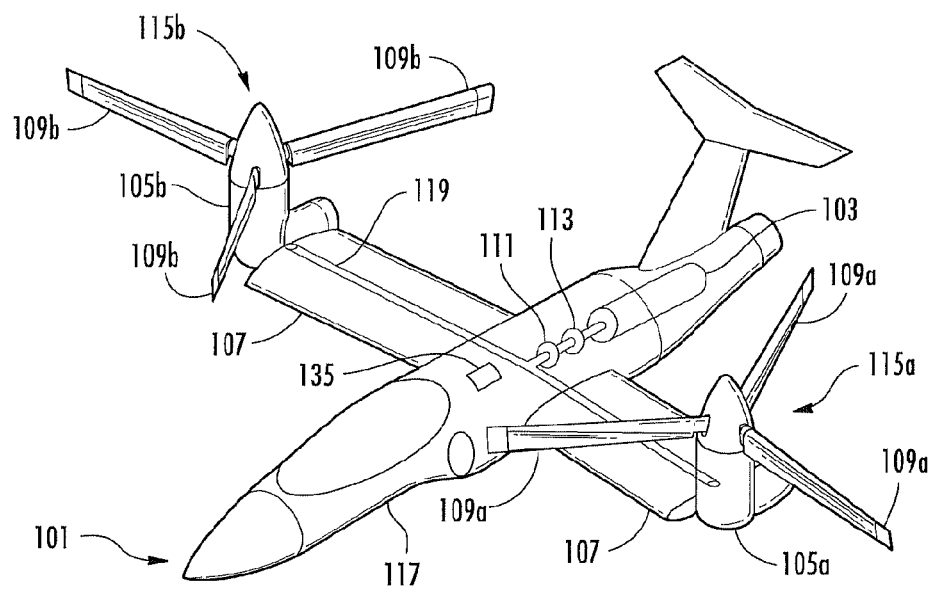
FIG. 1 is a perspective view a rotorcraft according to the preferred embodiment of the present application in a helicopter mode.

While the method and apparatus of the present application is susceptible to various modifications and alternative forms, specific embodiments thereof have been shown by way of example in the drawings and are herein described in detail. It should be understood, however, that the description herein of specific embodiments is not intended to limit the method and apparatus to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the method and apparatus of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present application represents a unique method and apparatus for the folding of rotor blades during an aircraft flight so as to allow the aircraft to fly further and faster. When the rotor blades are folded into a stowed position, the tiltrotor relies upon jet thrust of the engine for propulsion during forward flight.

Referring to FIG. 1, a tiltrotor aircraft 101 is depicted in a helicopter mode with nacelles 105a and 105b in an approximately vertical position. A nacelle 105a is configured to rotate a rotor system assembly 115a between a helicopter mode position and an airplane mode position. Similarly, a nacelle 105b is configured to rotate a rotor system assembly 115b between a helicopter mode position and an airplane mode position. While in helicopter mode, rotor blades 109a and 109b are selectively operably with nacelles 105a and 105b, respectively, in order to provide vertical lift to aircraft 101. Rotor assemblies 115a and 115b are configured to selectively control the pitch of rotor blades 109b and 109a, collectively and cyclically, in or order to provide yaw, pitch, and roll control to aircraft 101 in helicopter mode. An engine 103 provides power to the aircraft 101. A driveshaft 119 provides a means for power transfer between engine 103 and rotor assemblies 115a and 115b. A clutch 113 is configured to selectively disengaging and engaging rotational power between engine 103 and driveshaft 119. A rotor break 111 is configured to selectively slow and stop rotation of drive shaft 119 after clutch has disengaged power from engine 103 to driveshaft 119. A wing 107 is connected to a fuselage 117 so as to provide lift during forward flight. It should be appreciated that though engine 103 is shown in fuselage 117 other engine configurations may be used. For example, engine 103 can be located in other areas of fuselage 117, as well as on or near wing 107. It should also be appreciated that even though aircraft 101 is depicted with three rotor blades per rotor assembly, greater or fewer rotor blades can be employed. For example, it is fully contemplated that the method and apparatus of the present application may use four rotor blades 109a and 109b in rotor assemblies 115a and 115b, respectively. A computer 135 is schematically shown in fuselage 117, but it should be appreciated the computer 135 may take a number of forms and exist in a variety of locations within aircraft 101. Computer 135 is configured to control systems within aircraft 101, including the operation of folding rotor blades 109a and 109b in a spiral fold path.

Figure 2:
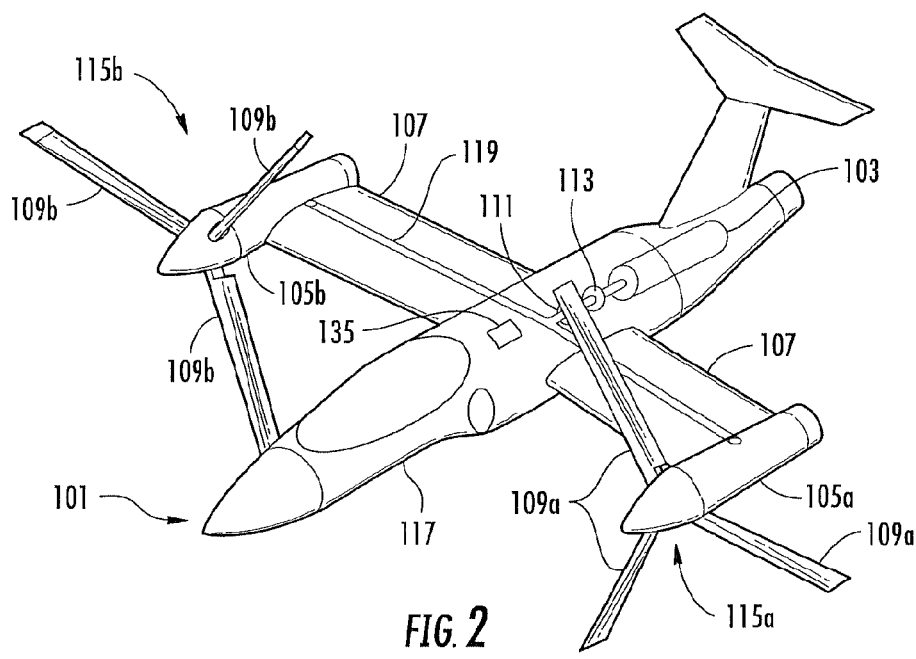
FIG. 2 is a perspective view a rotorcraft according to the preferred embodiment of the present application in an airplane mode.

Referring to FIG. 2, tiltrotor aircraft 101 is depicted in an airplane mode with nacelles 105a and 105b in an approximately horizontal position. While in airplane mode, rotor blades 109a and 109b are selectively operably with nacelles 105a and 105b, respectively, in order to provide forward thrust to aircraft 101. Rotor assemblies 115a and 115b are configured to selectively provide control inputs on aircraft 101 while in airplane mode. For example, rotor assemblies 115a and 115b can provide yaw control by selectively adjusting the pitch of rotor blades 109a differently from rotor blades 109b. It should be appreciated that other aerodynamic control features on wing 107 provide different and redundant control features on aircraft 101.

Figure 3:
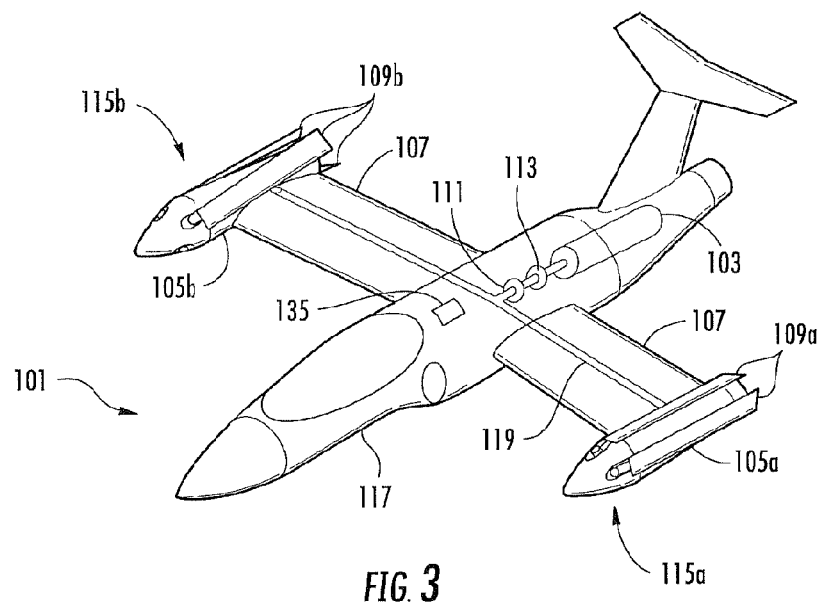
FIG. 3 is a perspective view a rotorcraft according to the preferred embodiment of the present application in a folded mode.

Referring to FIG. 3, tiltrotor aircraft 101 is depicted in a folded mode with rotor blades 109a and 109b folded in a stowed position against nacelles 105a and 105b, respectively. Aircraft 101 in a folded mode is able to fly more efficiently than when in an airplane mode. For example, in a folded mode, aircraft 101 is able to flying faster, farther, and smoother than when aircraft 101 relies upon rotor blades 109a and 109b for propulsive force. When aircraft 101 is in a folded mode, propulsive force is provided from thrust of engine 103.

It should be appreciated that rotor assemblies 115a and 115b are essentially symmetric versions of each other. As such, features discussed herein regarding rotor assembly 115b also symmetrically exist on rotor assembly 115a. It should be appreciated that rotor assemblies 115a and 115b function similarly in regards to the translating of aircraft 101 from helicopter mode, airplane mode, and folded mode, as discussed herein.

Figure 4:
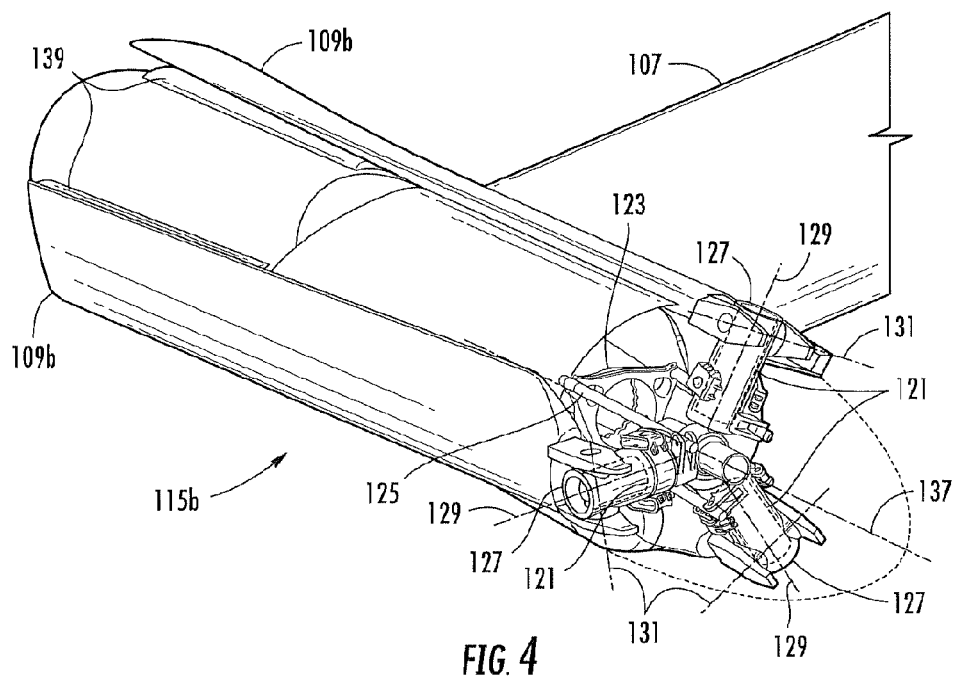
FIG. 4 is a perspective view of the rotor assembly from the rotorcraft according to the preferred embodiment, while in a folded mode.

Referring to FIG. 4, rotor assembly 115b is shown in further detail, while aircraft 101 is in folded mode. A swashplate 123 is configured to selectively adjust the pitch of rotor blades 109b. Swashplate 123 can tilt in a cyclic mode so as to differentially change the pitch of one or more rotor blades 109b. Similarly, swashplate 123 can be selectively actuated in a collective mode so as to uniformly change the pitch of rotor blades 109b. A pitch link 125 is operably connected to a grip pin 127 of each rotor blade 109b. Each grip pin 127 is configured to be selectively rotated by swashplate 123, via pitch link 125, about a grip pin axis 129. A blade fold actuator 121 is located in each grip pin 127. Each blade fold actuator is preferably an electric actuator, but may also be other actuators, such as hydraulic, piezoelectric, motor, or any mechanism suitable to provide rotational force. Additionally, even though a blade fold actuator 121 is depicted as being located within each grip pin 127, it should be appreciated that each blade fold actuator 121 can be located exterior to each grip pin 127. Each blade fold actuator 121 is operably associated with each rotor blade 109b so as to selectively rotate each rotor blade along a blade fold axis 131. An inflatable airbag 139 may be positioned on the skin of nacelle 105b so as to be selectively inflated upon folding of rotor blades 109b. Rotor assembly 105b is configured to rotate around rotor mast axis 137.

Figure 5:
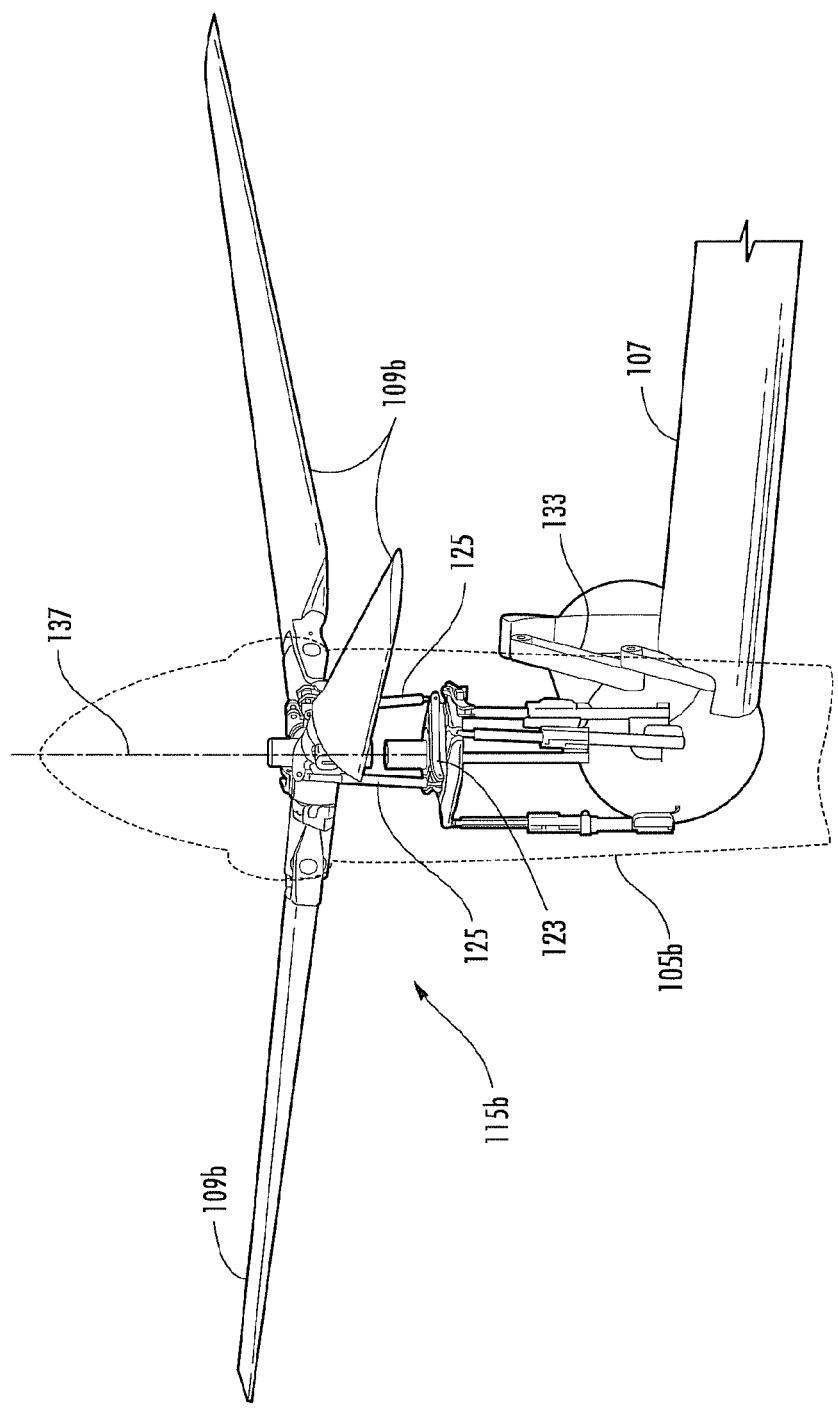
FIG. 5 is a perspective view of the rotor assembly from the rotorcraft according to the preferred embodiment, while in a helicopter mode.

Referring now to FIG. 5, rotor assembly 115b is shown in further detail, while aircraft 101 is in helicopter mode. Each pitch link 125 is operably associated with each rotor blade 109b. Swashplate 123 is configured to receive collective and cyclic inputs so as to selectively control the pitch of each rotor blade 109b. Nacelle 105b is configured to be actuated between a helicopter mode and an airplane mode via a nacelle actuator 133.

Figure 6:
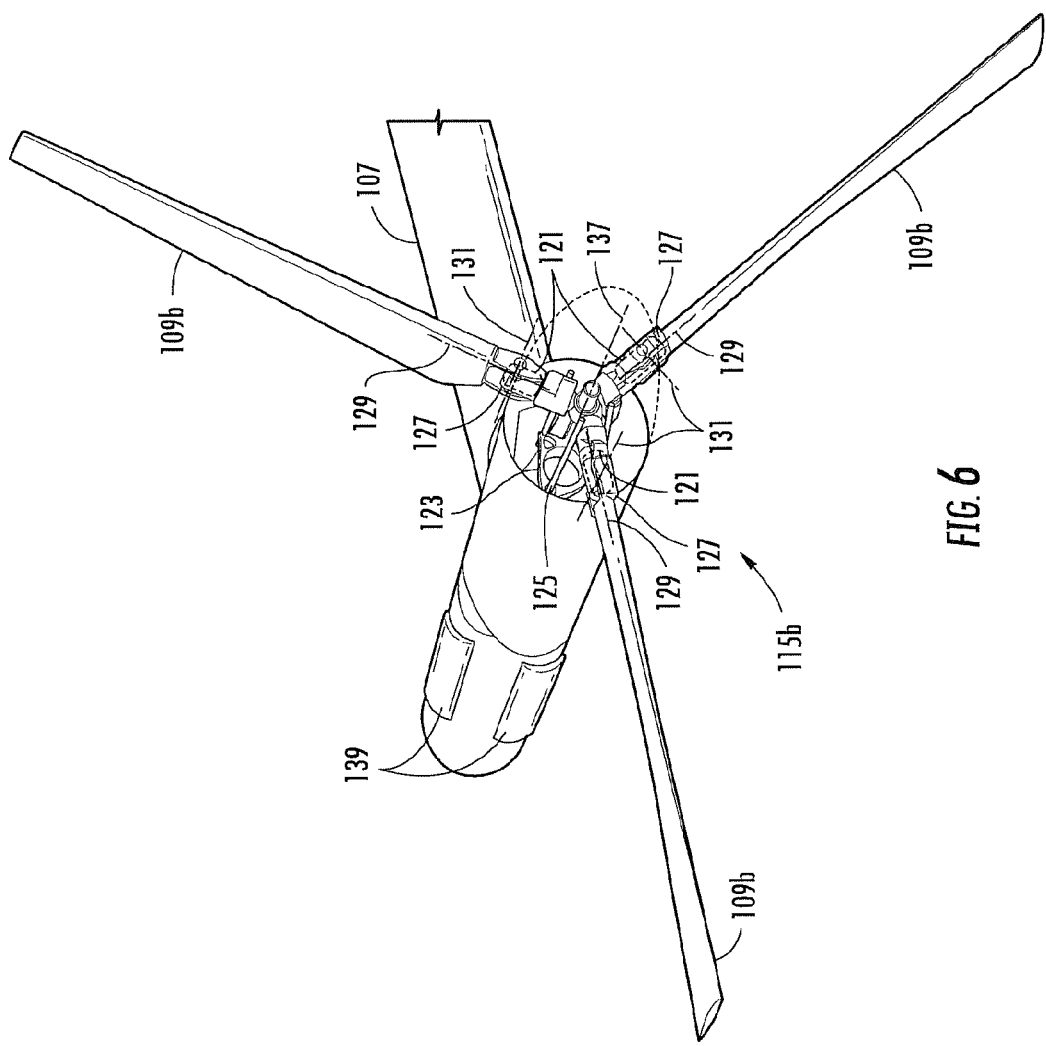
FIG. 6 is a perspective view of the rotor assembly from the rotorcraft according to the preferred embodiment, while in an airplane mode.
Figure 7A:
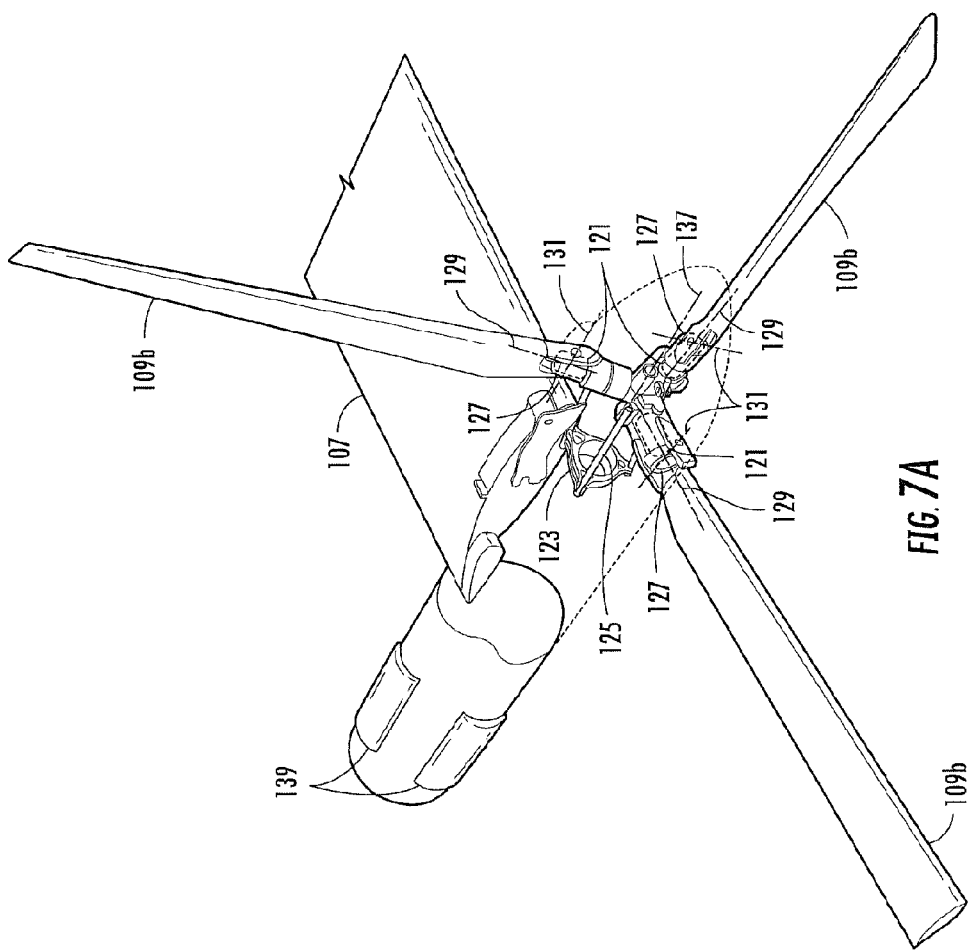
Figure 7C:
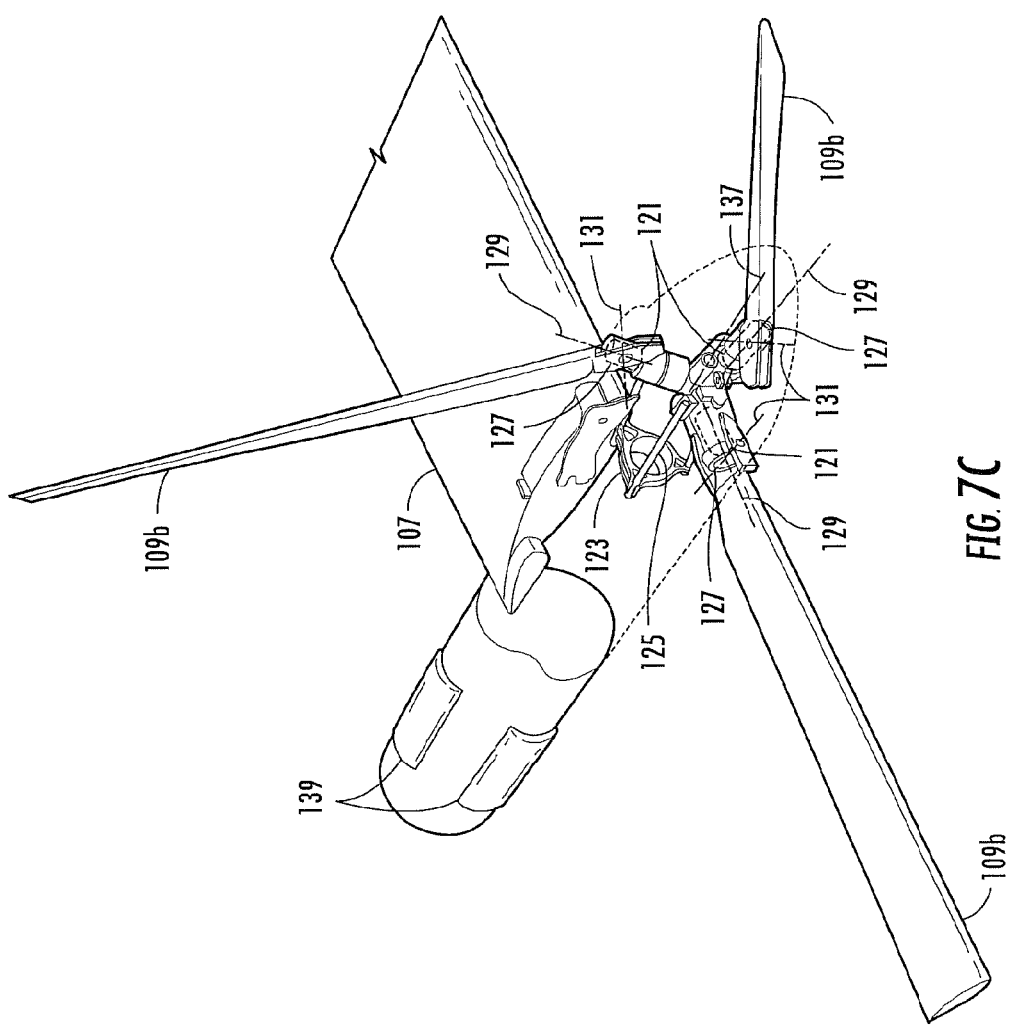
Figure 7D:
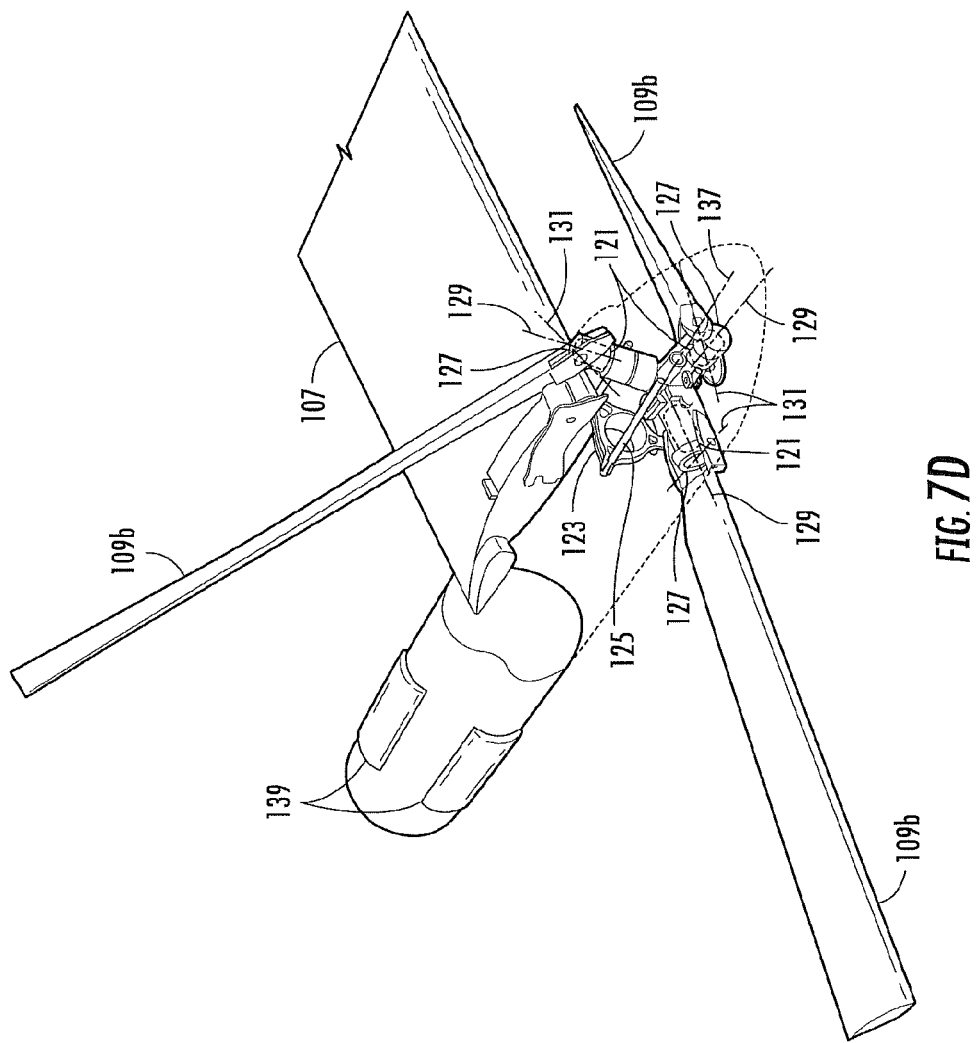
Figure 7E:
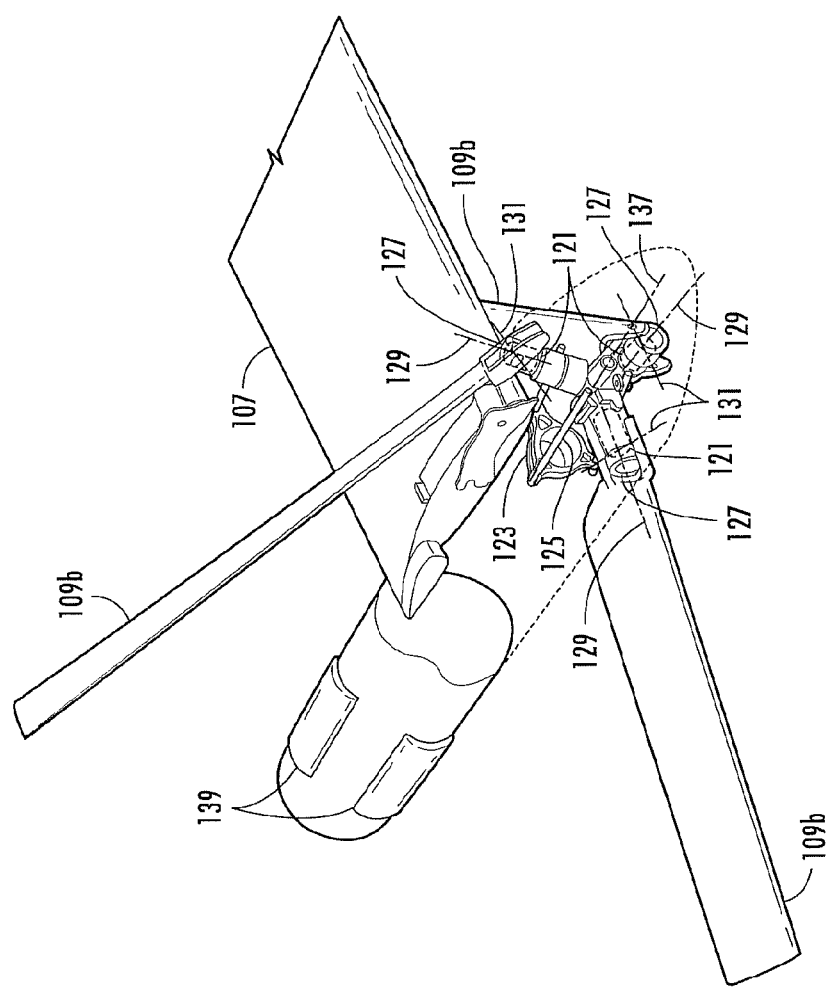
Figure 7F:
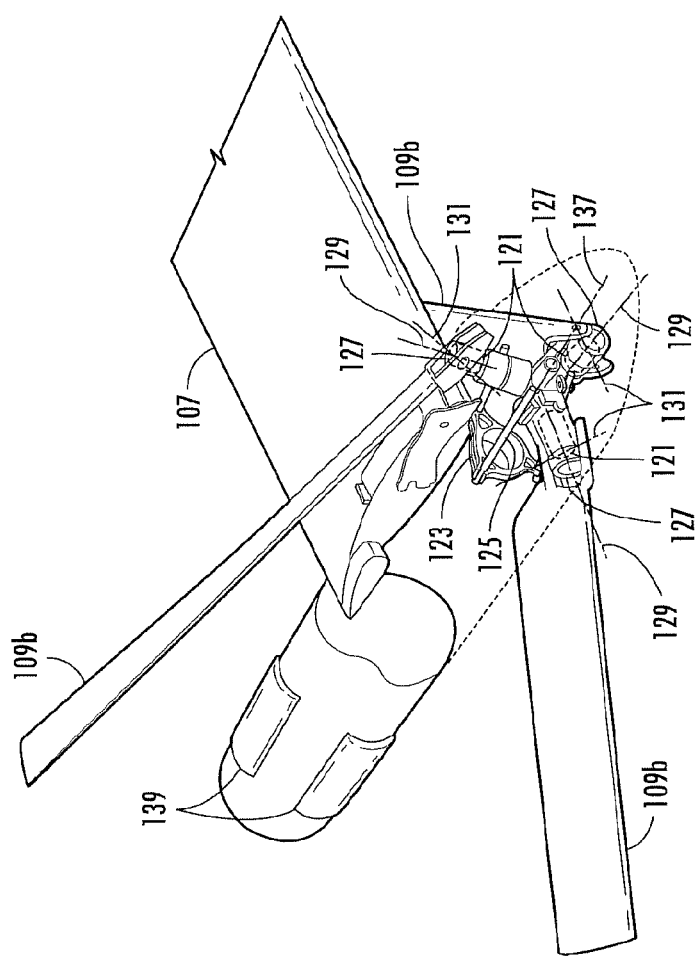
Figure 7G:
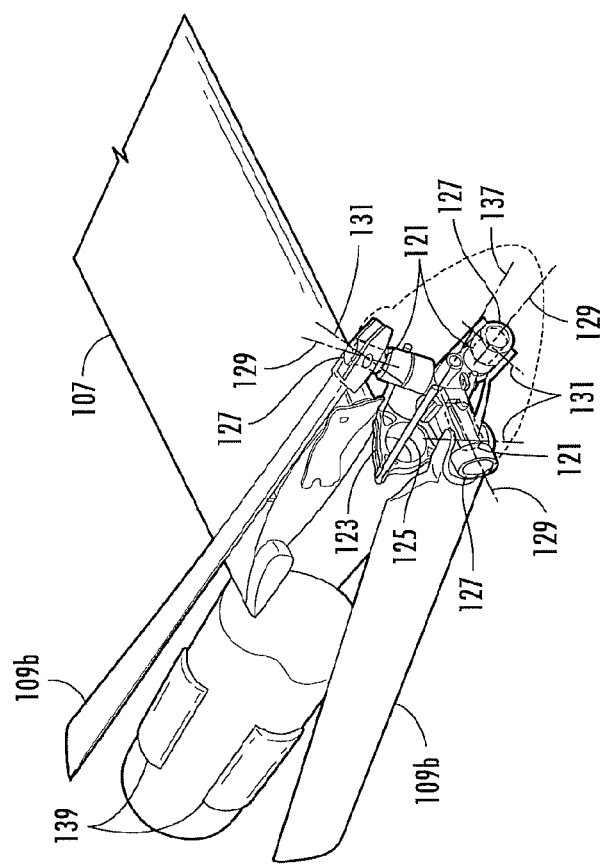
Figure 7H:
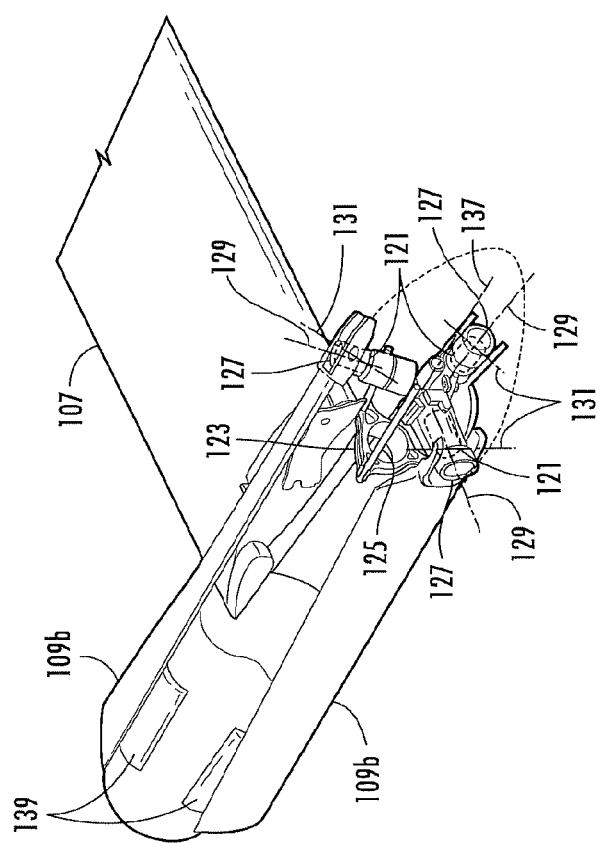

Referring now to FIG. 6, rotor assembly 115b is shown in further detail, while aircraft 101 is in airplane mode. Each pitch link 125 is operably associated with each rotor blade 109b. Swashplate 123 is configured to receive collective and cyclic inputs so as to selectively control the pitch of each rotor blade 109b.

Referring now to FIGS. 7A through 7H, the system for changing the position of rotor blades 109b from an airplane mode to a folded mode is described. Rotational power from engine 103 is decoupled from driveshaft 119 via clutch 113 (shown in FIGS. 1-3). Rotor blades 109b are feathered parallel to the direction of airflow during flight such that aerodynamic drag is reduced during the folding process. Rotor blades 109b are feathered by actuation of swashplate 123 in a manner so as to collectively adjust the pitch of each rotor blade 109b into feathered position. Rotational velocity of rotor blades 109b is decreased, aided by rotor brake 111, until rotor blades 109b reach a known index position. The preferred known index position, as shown in FIGS. 7A through 7H, is a rotor blade position wherein rotor blades do not foul with any wing structure. Additionally, the known index position coincides with predetermined locations for other features to be used in the rotor blade folding process, as discussed herein. Once rotor blades 109b are in the known index position, the rotor blades are locked in place so rotor blades 109b do not continue to rotate about rotor mast axis 137.

Still referring to FIGS. 7A through 7H, actuation of blade fold actuators 121 and swashplate 123 occurs in a predefined sequence, so as to facilitate the folding of rotor blades 109b in a specified spiral path. Specified spiral path is the folding sequence wherein rotor blades 109b are maintained edgewise into the airstream as much as possible throughout the folding process, i.e. feathered. By keeping rotor blades 109b primarily edgewise into the airstream, aerodynamic loading and drag on rotor blades 109b is minimized. Typically, rotor blades are designed to exhibit maximum strength while experience centrifugal loading. As such, rotor blades are typically unable to withstand as much bending forces while in a static position. Therefore, folding rotor blades 109b in the spiral load path allows rotor blades 109b to fold while minimizing aerodynamic loading.

Still referring to FIGS. 7A through 7H, the folding of rotor blades 109b in a spiral fold path involves simultaneous actuation of blade fold actuators 121 so that rotor blades fold about blade fold axis 131, while rotor blades 109b are feathered edgewise into the free airstream. During the folding of rotor blades 109b about blade fold axis 131, rotor blades 109b are also actuated about grip pin axis 129 by swashplate 123 so that rotor blades 109b are positioned approximately near nacelle 105b. Preferably, rotating of rotor blades 109b about blade fold axis 131, by actuation of blade fold actuator 121, occurs at a linear rate. In contrast, most of the actuation of swashplate 123, so as to rotate rotor blades 109b about grip pin axis 129, occurs towards the end of the spiral path. As a result, rotor blades 109b remain feathered edgewise into the free airstream for as long as possible during the process. Rotor blades 109b contact hard stops located within rotor assembly 115b when rotor blades 109b are fully folded. With rotor blades 109b in the fully folded position, airbags 139 may be deployed from the skin of nacelle 105b, under each rotor blade 109b. Airbags 139 act as a buffer in order to minimize contact between rotor blades 109b and nacelle 105b, as well as tailor aerodynamic airflow around rotor blades 109b while in the folded position. While rotor blades 109b are in the folded position, blade fold actuators 121 are locked in position. While rotor blades 109b are in the folded position, aircraft 101 can fly further and faster by relying upon thrust propulsion from engine 103, instead of propulsion from rotor blades 109b. Aircraft 101 can convert from folded mode back to airplane mode by reversing the process described herein for converting from airplane mode to folded mode. The process for converting from airplane mode to folded mode takes approximately 6-8 seconds. However, it should be appreciated that the process can be configured to take to less or more time, depending upon the application.

The method and apparatus of the present application provides significant advantages, including: (1) providing a method for folding the rotor blades so as to allow an aircraft to rely upon jet thrust propulsion during a folded mode; (2) reducing the drag upon the rotor blades during the folding process by feathering the rotor blades substantially edgewise into the airstream while folding; and (3) employing inflatable air bags while rotor blades are in the folded position so as to tailor airflow around the folded rotor blades.

It is apparent that a method and apparatus with significant advantages has been described and illustrated. Although the method and apparatus of the present application is shown in a limited number of forms, it is not limited to just these forms, but is amenable to various changes and modifications without departing from the spirit thereof.

The invention claimed is:

1. A foldable rotor system for a rotorcraft, the foldable rotor system, comprising:
   a rotor assembly comprising:
      a rotor blade connected to a grip pin that is rotatable about a grip pin axis;
      a swashplate operably associated with the grip pin to rotate the rotor blade about the grip pin axis;
      a blade fold actuator operably associated with the rotor blade to rotate the rotor blade about a blade fold axis; and
      an inflatable air bag configured to act as a buffer for the rotor blade when in a folded position;
      wherein the grip pin axis intersects the blade fold axis.

2. The foldable rotor system according to claim 1, wherein the blade fold actuator is configured to fold the rotor blade about the blade fold axis while the rotor blade simultaneously rotates about the grip pin axis.

3. The foldable rotor system according to claim 1, wherein the swashplate is operably associated with the grip pin through a pitch link.

4. The foldable rotor system according to claim 1, wherein the blade fold actuator is located within the grip pin.

5. The foldable rotor system according to claim 1, wherein the rotor assembly is part of a nacelle, the nacelle being configured to rotate the rotor assembly between a helicopter mode and an airplane mode.

6. The foldable rotor system according to claim 1, further comprising:
   a computer for controlling the blade fold actuator.

7. The foldable rotor system according to claim 1, further comprising:
   a driveshaft operably connected to the rotor assembly; and
   a rotor brake configured to selectively stop the driveshaft from rotating before the rotor blade rotates about the blade fold axis.

8. The foldable rotor system according to claim 1, further comprising:
   a driveshaft operably connected to the rotor assembly; and
   a clutch configured to selectively control transmission of torque to the driveshaft.

9. A method of spirally folding rotor blades on a rotorcraft during flight, comprising:
   disengaging power from an engine to a driveshaft via a clutch;
   halting the rotation of the driveshaft and the rotor blades;
   changing the pitch of the rotor blades such that a leading edge of each rotor blade is substantially edgewise into an airstream;
   folding each of the rotor blades about a blade fold axis towards a downstream direction, while selectively rotating each of the rotor blades about a grip pin axis, until the rotor blades lie substantially parallel to the direction of the airstream; and
   inflating an inflatable air bag so as to provide pressure against the rotor blades;
   wherein the grip pin axis intersects the blade fold axis.

10. The method according to claim 9, further comprising:
    locking the plurality of rotor blades in a folded position.

11. The method according to claim 9, wherein the rotor blades remain substantially edgewise during a first part of the folding.

12. The method according to claim 9, wherein a rate of the folding each of the rotor blades is substantially linear, while a rate of rotating each of the rotor blades about the grip pin axis increases until the rotor blades lie substantially parallel to the direction of the airstream.

13. An aircraft, comprising:
    a wing member attached to a fuselage;
    nacelles rotatably coupled to the wing member, each nacelle being rotatable between an airplane mode and a helicopter mode;
    a rotor assembly operably associated with each nacelle, the rotor assembly comprising:
       a swashplate;
       a grip pin rotatable about a grip pin axis by the swashplate;
       a rotor blades connected to each grip pin; and
       a blade fold actuator operably connected to each rotor blade for rotating the rotor blade about a blade fold axis;
       wherein the grip pin axis intersects the blade fold axis; and
       wherein operation of the swashplate and the blade fold actuator enables each rotor blade to follow a spiral fold path such that each rotor blade remains substantially edgewise through the spiral fold path so as to minimize aerodynamic drag upon each rotor blade; and
    an inflatable air bag on each nacelle so as to provide pressure against each rotor blade when each rotor blade is in a folded position.

14. The aircraft according to claim 13, wherein the foldable rotor system further comprises:
    a mechanical lock configured to lock each rotor blade when each rotor blade is in a folded position.

15. The foldable rotor system according to claim 1, wherein:
    the rotor assembly is rotatable about a rotor mast axis; and
    the grip pin axis intersects the blade fold axis and the rotor mast axis.

16. A rotor assembly comprising:
    a rotor blade connected to a grip pin that is rotatable about a grip pin axis;
    a swashplate operably associated with the grip pin to rotate the rotor blade about the grip pin axis;

a blade fold actuator operably associated with the rotor blade to rotate the rotor blade about a blade fold axis into a folded position; and an inflatable air bag configured to act as a buffer for the rotor blade when in the folded position.

* * * * *